US007693943B2

(12) United States Patent
Rajan et al.

(10) Patent No.: US 7,693,943 B2
(45) Date of Patent: Apr. 6, 2010

(54) CLASSIFICATION OF ELECTRONIC MAIL INTO MULTIPLE DIRECTORIES BASED UPON THEIR SPAM-LIKE PROPERTIES

(75) Inventors: Vadakkedathu Thomas Rajan, Briarcliff Manor, NY (US); Jason L. Crawford, Ossining, NY (US); Mark N. Wegman, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 1169 days.

(21) Appl. No.: 10/763,929

(22) Filed: Jan. 23, 2004

(65) Prior Publication Data

US 2005/0165895 A1    Jul. 28, 2005

(51) Int. Cl.
 *G06F 15/16* (2006.01)
(52) U.S. Cl. .................. 709/206; 709/223; 709/224
(58) Field of Classification Search .................. None
See application file for complete search history.

(56) References Cited

U.S. PATENT DOCUMENTS

| | | | |
|---|---|---|---|
| 5,999,932 A | 12/1999 | Paul | 707/10 |
| 6,023,723 A | 2/2000 | McCormick et al. | 709/206 |
| 6,029,164 A | 2/2000 | Birrell et al. | 707/3 |
| 6,092,101 A | 7/2000 | Birrell et al. | 709/206 |
| 6,161,130 A * | 12/2000 | Horvitz et al. | 709/206 |
| 6,167,434 A | 12/2000 | Pang | 709/206 |
| 6,199,102 B1 | 3/2001 | Cobb | 709/206 |
| 6,249,805 B1 | 6/2001 | Fleming, III | 709/206 |
| 6,266,692 B1 | 7/2001 | Greenstein | 709/206 |
| 6,324,569 B1 | 11/2001 | Ogilvie et al. | 709/206 |
| 6,330,590 B1 | 12/2001 | Cotten | 709/206 |
| 6,421,709 B1 | 7/2002 | McCormick et al. | 709/206 |
| 6,484,197 B1 | 11/2002 | Donohue | 709/206 |
| 6,487,586 B2 | 11/2002 | Ogilvie et al. | 709/206 |
| 6,493,007 B1 | 12/2002 | Pang | 715/835 |
| 6,546,416 B1 * | 4/2003 | Kirsch | 709/206 |
| 6,615,241 B1 * | 9/2003 | Miller et al. | 709/206 |
| 6,654,787 B1 | 11/2003 | Aronson et al. | 709/206 |
| 6,748,422 B2 * | 6/2004 | Morin et al. | 709/206 |
| 6,769,016 B2 * | 7/2004 | Rothwell et al. | 709/206 |
| 6,842,773 B1 * | 1/2005 | Ralston et al. | 709/206 |
| 7,016,939 B1 * | 3/2006 | Rothwell et al. | 709/206 |
| 7,206,814 B2 * | 4/2007 | Kirsch | 709/206 |
| 7,219,148 B2 * | 5/2007 | Rounthwaite et al. | 709/206 |
| 7,257,564 B2 * | 8/2007 | Loughmiller et al. | 706/16 |

(Continued)

OTHER PUBLICATIONS

Dennis, Jim. "Stop, in the Name of Spam." Communications of the ACM. Nov. 1988. vol. 41, No. 11. ACM Press. 11-14.*

(Continued)

*Primary Examiner*—Vivek Srivastava
*Assistant Examiner*—Jeffrey R Swearingen
(74) *Attorney, Agent, or Firm*—Michael J. Buchenhorner; Vazken Alexanian

(57) ABSTRACT

In an electronic mail system, an apparatus and method for providing, in addition to the conventional "Inbox" directory in which all incoming e-mails are normally received, a plurality of appropriately labeled directories for containing e-mails suspected of being spam, grading the level of spaminess of the incoming e-mails and then moving or copying the incoming e-mails into one or more of the spam directories based upon the e-mails' respective levels of spaminess.

15 Claims, 3 Drawing Sheets

U.S. PATENT DOCUMENTS

| | | | |
|---|---|---|---|
| 7,373,385 B2* | 5/2008 | Prakash | 709/206 |
| 7,386,520 B2* | 6/2008 | Hehl et al. | 705/400 |
| 7,433,923 B2* | 10/2008 | Adkins | 709/206 |
| 7,519,668 B2* | 4/2009 | Goodman et al. | 709/206 |
| 2002/0116463 A1* | 8/2002 | Hart | 709/206 |
| 2003/0009698 A1* | 1/2003 | Lindeman et al. | 709/224 |
| 2003/0195937 A1* | 10/2003 | Kircher et al. | 709/207 |
| 2005/0060643 A1* | 3/2005 | Glass et al. | 715/501.1 |
| 2005/0076110 A1* | 4/2005 | Mathew et al. | 709/206 |
| 2005/0080855 A1* | 4/2005 | Murray | 709/206 |
| 2005/0080860 A1* | 4/2005 | Daniell et al. | 709/206 |
| 2005/0120019 A1* | 6/2005 | Rigoutsos et al. | 707/6 |
| 2005/0188023 A1* | 8/2005 | Doan et al. | 709/206 |
| 2006/0031303 A1* | 2/2006 | Pang | 709/206 |
| 2006/0168006 A1* | 7/2006 | Shannon et al. | 709/206 |
| 2008/0120378 A2* | 5/2008 | Smith | 709/206 |

OTHER PUBLICATIONS

Cranor, Lorrie Faith et al. "Spam!". Communications of the ACM. Aug. 1988. vol. 41, No. 8. ACM Press. 74-83.*

Androutsopoulos, Ion et al. "An Experimental Comparison of Naïve Bayesian and Keyword-Based Anti-Spam Filtering with Personal E-mail Messages." Proceedings of the 23rd annual international ACM SIGIR conference on Research and development in information retrieval. ACM Press. Jul. 2000. 160-167.*

Mehran Sahami, Susan Dumais, David Heckerman, Eric Horvitz, "A Bayesian Approach to Filtering Junk E-Mail."

Paul Graham, "Stopping Spam," Aug. 2003.

Paul Graham, "Filters that Fight Back," Aug. 2003.

Paul Graham, "Better Bayesian Filtering," Jan. 2003.

Paul Graham, "So Far, So Good," Aug. 2003.

* cited by examiner

CLASSIFICATION OF ELECTRONIC MAIL INTO MULTIPLE DIRECTORIES BASED UPON THEIR SPAM-LIKE PROPERTIES

BACKGROUND OF THE INVENTION

1. Field of the Invention

The invention relates to processing unsolicited electronic mail. More particularly, this invention relates to classifying electronic mail into multiple directories based upon their spam-like properties.

2. Description of the Background Art

Electronic mail ("e-mail") is a common form of communication for many individuals and most organizations throughout the world. Unfortunately however, e-mail recipients are often the targets of unsolicited mass mailings sent by mass marketers offering their products or services. Reminiscent of excessive mass solicitations via postal services, facsimile transmissions and telephone calls, an e-mail recipient may receive hundreds of unsolicited e-mails over a short period of time. Similar to the task of handling "junk" postal mail and faxes, an e-mail recipient must laboriously sift through his or her incoming mail simply to sort out the unsolicited "junk" e-mail from legitimate e-mails. Such unsolicited "junk" e-mail is in common parlance referred to as "spam".

Many vendors of electronic mail servers, as well as many third-party vendors, offer spam-blocking software to detect, label and sometimes automatically remove spam. Presently, there exist many methods for detecting, labeling and removing spam. Representative methods are taught in the following U.S. patents, the disclosures of which are hereby incorporated by reference herein:

| Pat. No. | Title |
| --- | --- |
| 5,999,932 | System and Method for Filtering Unsolicited Electronic Mail Messages Using Data Matching and Heuristic Processing |
| 6,023,723 | Method and System for Filtering Unwanted Junk E-Mail Utilizing a Plurality of Filtering Mechanisms |
| 6,029,164 | Method and Apparatus for Organizing and Accessing Electronic Mail Messages Using Labels and full Text and Label Indexing |
| 6,092,101 | Method for Filtering Mail Messages for a Plurality of Client Computers Connected to a Mail Service System |
| 6,161,130 | Technique Which Utilizes a Probalistic Classifier to Detect "Junk" E-Mail by Automatically Updating A Training and Re-Training the Classifier Based on the Updated Training List |
| 6,167,434 | Computer Code for Removing Junk E-Mail Messages |
| 6,199,102 | Method and System for Filtering Electronic Messages |
| 6,249,805 | Method and System for Filtering Unauthorized Electronic Mail Messages |
| 6,266,692 | Method for Blocking All Unwanted E-Mail (Spam) Using a Header-Based Password |
| 6,324,569 | Self-Removing Email Verified or Designated as Such by a Message Distributor for the Convenience of a Recipient |
| 6,330,590 | Preventing Delivery of Unwanted Bulk E-Mail |
| 6,421,709 | E-Mail Filter and Method Thereof |
| 6,484,197 | Filtering Incoming E-Mail |
| 6,487,586 | Self-Removing Email Verified or Designated as Such by a Message Distributor for the Convenience of a Recipient |
| 6,493,007 | Method and Device for Removing Junk E-Mail Messages |
| 6,654,787 | Method and Apparatus for Filtering E-Mail |

As taught by several of the above-referenced patents, there exist spam filters that grade the spaminess of incoming e-mail by processing the e-mail for spam-like properties along a scale (e.g. 0-100) and if the incoming e-mail is graded to have a spaminess level above a predetermined numeric threshold (e.g., above 80), the e-mail is automatically moved from the recipient's Inbox into a spam directory. Ideally, all of the spam will be moved to the spam directory, thereby obviating the need for the recipient to read the e-mail in the spam directory. As used herein, the term "spaminess" may include undesired or unsolicited e-mails determined on a variety of objective and subjective scales including but not limited to politics, pornography and marketing scams.

Many algorithms exist for processing incoming e-mail and grading the spaminess of the e-mail. Some representative algorithms are taught in the foregoing patents whereas others are taught in the following publications, the disclosures of which are hereby incorporated by reference herein:

---

Hooman Katirai, Filtering Junk E-Mail: A Performance Comparison between Genetic Programming and Naïve Bayes, Sep. 10, 1999.
Jefferson Provost, Naïve-Bayes vs. Rule-Learning in Classification of Email, Technical Report AI-TR-99-284.
Mehran Sahami, Susan Dumais, David Heckerman & Eric Horvitz, A Bayesian Approach to Filtering Junk E-Mail, www.paulgram.com
Paul Graham, Stopping Spam, August 2003, www.paulgram.com
Paul Graham, So Far So Good, August 2003, www.paulgram.com
Paul Graham, Filters That Fight Back, August 2003, www.paulgram.com
Paul Graham, Better Bayesian Filtering, January, 2003, www.paulgram.com

---

Unfortunately, it is often the case that the predetermined threshold, coupled with the inherent inaccuracies of the algorithm employed for grading of the incoming e-mail for spaminess, results in some e-mail being misclassified as spam when it is not, or visa versa. Obviously, as incoming mail is assigned a high score based upon its level of spaminess, the likelihood of classifying incoming e-mail as spam increases as the threshold is decreased. However, this disadvantageously results in a greater likelihood of non-spam e-mails being misclassified as spam and consequently being overlooked and not read by the recipient. Conversely, increasing the threshold decreases the chance that non-spam e-mails are misclassified as spam.

The use of a spaminess threshold thus results in a paradox of being, on the one hand, too guarded of potentially misclassifying non-spam e-mails as spam by raising the threshold too high whereupon a significant number of spam e-mails would fail to be identified as spam and remain in the recipient's Inbox and, on the other hand, being too aggressive by reducing the threshold resulting in non-spam e-mails being classified as spam. Consequently, the recipient is often faced with the dilemma of having an inbox with significant amounts of spam or having to frequently scan the presumed spam e-mail in the spam directory to verify that a legitimate e-mail was not improperly moved to the spam directory.

Therefore, it is an object of this invention to provide an improvement which overcomes the aforementioned inadequacies of the prior art and provides an improvement which is a significant contribution to the advancement of the art of filtering spam.

Another object of this invention is to provide an apparatus and method for handling incoming e-mail based upon the e-mail's spam-like properties.

Another object of this invention is to provide an apparatus and method for grading incoming e-mail for spaminess and, based upon the e-mail's spaminess grade, moving the incoming e-mail to at least one of a plurality of appropriately labeled directories.

The foregoing has outlined some of the pertinent objects of the invention. These objects should be construed to be merely illustrative of some of the more prominent features and applications of the intended invention. Many other beneficial results can be attained by applying the disclosed invention in a different manner or modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

For the purpose of summarizing this invention, this invention comprises an apparatus and method for providing, in addition to the conventional "Inbox" directory in which all incoming mail is normally received, a plurality of appropriately labeled directories for containing e-mails suspected of being spam, grading the level of spaminess of the incoming e-mail and then moving or copying incoming e-mail into one or more of the spam directories based upon the e-mail's respective level of spaminess.

For example, according to the invention, each piece of incoming mail is graded along a scale, according to any of the prior art methods, to determine the level of spaminess of the e-mail. At least two spam directories are provided and labeled to contain spam of certain ranges of spaminess along the scale. Each piece of incoming mail is graded (objectively by an algorithm and/or subjectively by "voting and teaching" by the recipient, or a combination thereof) and, if determined to possibly or likely constitute spam, then moved into the respective directory according to its level of spaminess. Upon grading, if the incoming e-mail is determined with a high degree of probability not to constitute spam, it is left in the Inbox.

For example, a spam directory labeled "black" could be provided for containing e-mail whose level of spaminess is graded high, representative of likely constituting spam. If the scale employed is 0 to 100, an exemplary range could be above 80 for the "black" spam directory. Correspondingly, a spam directory labeled "grey" could be provided for containing e-mail whose level of spaminess is graded medium, representative of probably constituting spam. An exemplary range for the "grey" spam directory could be 30-80. Thus, all incoming mail graded to have a spaminess level of above 80 would be moved from the Inbox to the "black" spam directory, all mail graded to have a spaminess level of 30-80 would be moved to the "grey" spam directory and, finally, all mail graded to have a spaminess level less than 30 would remain in the Inbox.

The invention advantageously grades e-mail according to the level of spaminess and then moves the e-mail into the appropriately labeled directory (as used herein, a directory may optionally be virtual directory or may reside in a separate repository in the same server or in a remote server). In this manner, the recipient has a high degree of confidence that all of the mail in his or her Inbox will not constitute spam. More importantly, the recipient may review the mail suspected to constitute spam in each of the spam directories at a frequency and with a level of care commensurate with the assigned spaminess range associated with each spam directory. Indeed, the recipient may not necessarily review the mail in the directory with the highest level of spaminess. Moreover, such mail may be automatically deleted immediately or with an appropriate delay.

More specifically, when employing the above example, the recipient's Inbox may be regarded as the "white" directory containing e-mail that determined with a high degree of certainty to not constitute spam. The recipient may constantly monitor the "white" Inbox for incoming e-mail and read the mail being received therein without being distracted by the existence of spam. The recipient may choose to read the e-mail in "grey" directory less frequently, such as only at the close of each business day, to determine if any of the "grey" mail therein is legitimate mail and needs to be responded to or otherwise handled by the recipient. Other algorithms may be employed to allow the recipient to vote on the grey mail and train the system to better determine spaminess according to the recipient's personal preferences. Finally, the recipient may choose to infrequently (e.g., once a week) but quickly scan through the headers of the e-mail in the "black" directory to verify that there is no legitimate e-mail therein.

It should be appreciated that greater granularity beyond the "white" Inbox, the "grey" spam directory and the "black" spam directory can be achieved according to the subject invention by simply including a greater number of spam directories, each assigned with their respective range of spaminess and with each being appropriately labeled to indicate to the recipient how often and with what degree of care the spam e-mail therein should be read or scanned to verify that no legitimate e-mails are inadvertently overlooked. Moreover, the labeling of the Inbox and spam directories could be done with color-codes. For example, in the case of a more graduated five ranges, the colors could be Green (for the Inbox) and then Blue, Yellow, Orange and Red (for the first, second, third and forth spam directories) with five assigned a spaminess ranges of 0-20, 21-40, 41-60, 61-80 and 81-100, respectively.

It should also be appreciated that without departing from the spirit and scope of the invention, the spaminess ranges assigned to the adjacent directories may overlap and each e-mail whose grade is included within the overlap, is also copied into the adjacent directory. For example, using the foregoing example, the five graduated ranges for the Green, Blue, Yellow, Orange and Red directories, may be assigned spaminess ranges of 0-20, 21-40, 41-60, 55-85 and 81-100, respectively such that the Orange span directory overlaps with the Yellow and the Red spam directories. Thus, an e-mail having been graded an 85 would be moved from the Inbox into the Red spam directory but also copied into the Orange spam directory where it is likely to be given more scrutiny by the recipient that it otherwise would be given if it was only included in the Red spam directory. Similarly, an e-mail graded with a grade of 58 would be included in both the Yellow and Orange spam directories.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other apparatuses and methods for carrying out the same purposes of the present invention. It should also be realized by those skilled in the art that such equivalent apparatuses and methods do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

DETAILED DESCRIPTION

Figure 1:
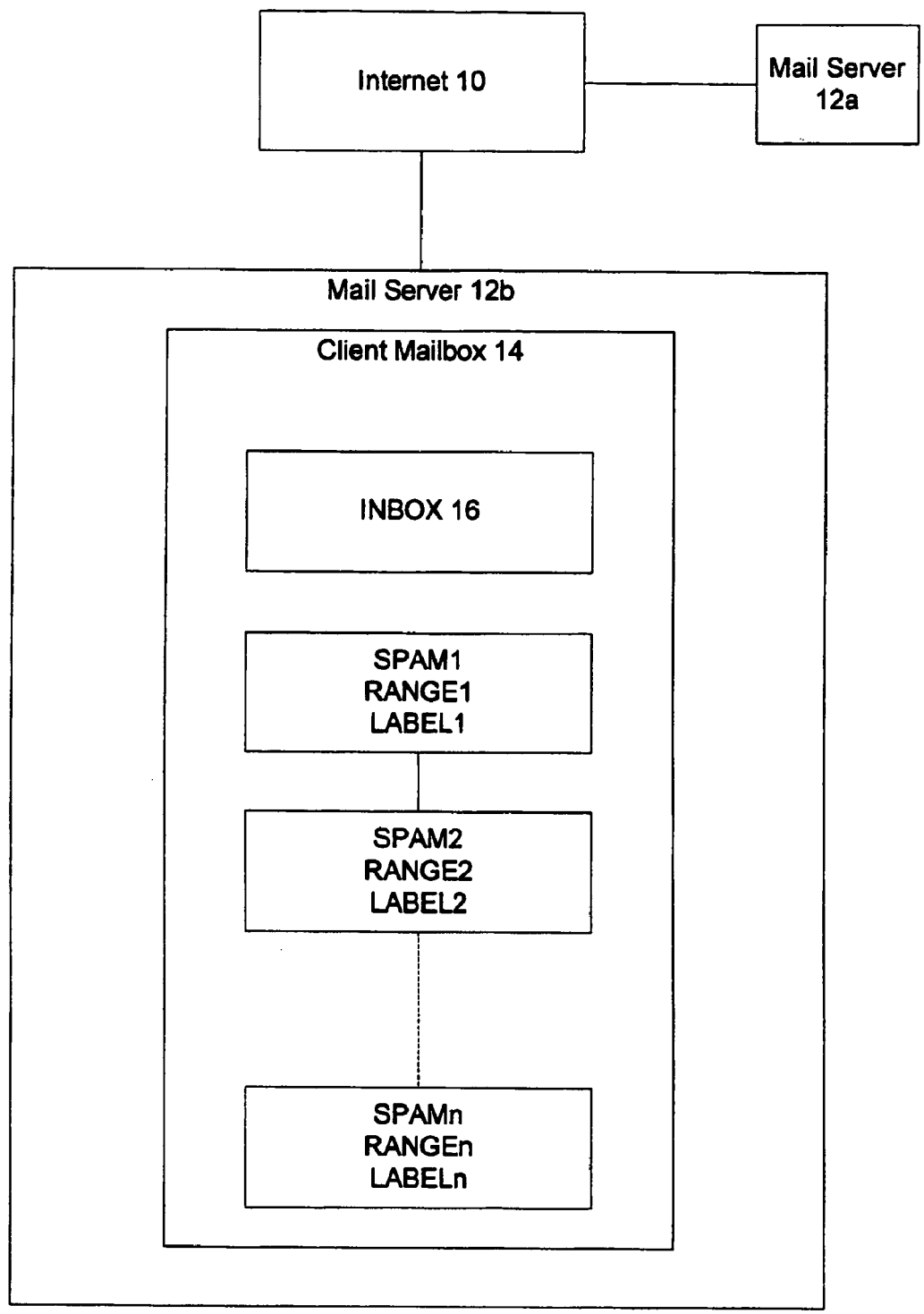
FIG. 1 is a block diagram of the apparatus of the invention showing an e-mail Inbox and a plurality of spam directories, each containing e-mails with respective level of spaminess.

Referring to FIG. 1, electronic mail ("e-mail") sent between or among individuals and companies throughout the world travels via the Internet, generally indicated by numeral 10, composed of a plurality of interconnected backbone and other sites that transfer mail from one mail server 12$a$ uniquely identified by an Internet protocol ("IP") address to another mail server 12$b$ uniquely identified by another IP address, each IP address being conveniently mapped to an upper-level domain name. Each domain mail server 12 typically includes one or more client mailboxes 14.

Each client mailbox 14 includes at least an Inbox 16 into which is delivered incoming e-mail addressed to the owner of the Inbox 16 as the intended recipient of the e-mail (hereinafter "recipient"). The recipient reads the e-mails contained within the Inbox 16 and then typically deletes the e-mail or copies or moves it to other directories within the mailbox.

According to the present invention, in addition to the Inbox, at least two spam directories (SPAM1, SPAM2, . . . SPAMn, n≧2) are provided. Each spam directory is assigned a spaminess range (RANGE1, RANGE2, . . . RANGEn) within a predefined spaminess scale and appropriately labeled (LABEL1, LABEL2, . . . LABELn) corresponding to the increasing respective spaminess ranges RANGEn. Without departing from the spirit and scope of the invention, one or more of the ranges RANGEn may overlap with respective adjacent ranges.

Figure 2:
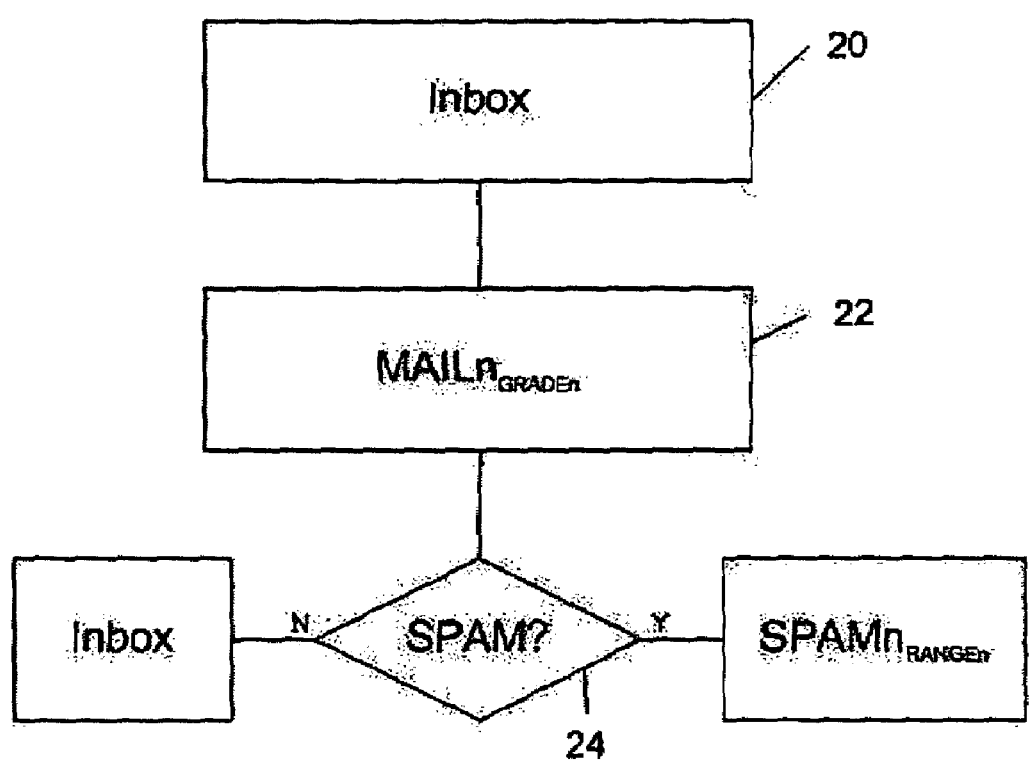
FIG. 2 is a block diagram of the method of the invention showing a process flow of an incoming e-mail.

As shown in FIG. 2, as each incoming e-mail (MAIL1, MAIL2, . . . MAILn) is received by the mail server 12 at block 20, it is graded (MAIL1$_{GRADE1}$, MAIL2$_{GRADE2}$, . . . MAILn$_{GRADEn}$,) for spaminess at block 22 and, at block 24, left in and/or moved and/or copied to the Inbox 16 and/or the spam director(ies) SPAMn to which is assigned the respective RANGEn encompassing the spaminess grade MAILn$_{GRADEn}$.

It shall be understood that the claimed invention is operable with any algorithm that grades e-mails for spaminess. The algorithms employed for grading the incoming mail MAILn may therefore constitute any prior art algorithm, or any future developed algorithm, that grades e-mails for spaminess. It shall also be understood that the mail system employed may comprise a client/server topology in which event the computing involved for grading the e-mail MAILn for spaminess may be processed either on the server or the client processors, or partly by both. Furthermore, in the event of processing on a mail server or other computing topology, the incoming mail MAILn once graded may bypass the Inbox altogether and be immediately moved or copied into be respective spam directory SPAMn according to its grade MAILn$_{GRADEn}$. Finally, it shall be understood that during set-up the recipient or his or her stead may specify the number of spam directories desired. Additional user-settable configurations may include the ability to name and color-code the spam directories, as well as the ability to assign their respective ranges thereto, with or without any overlapping.

Figure 3:
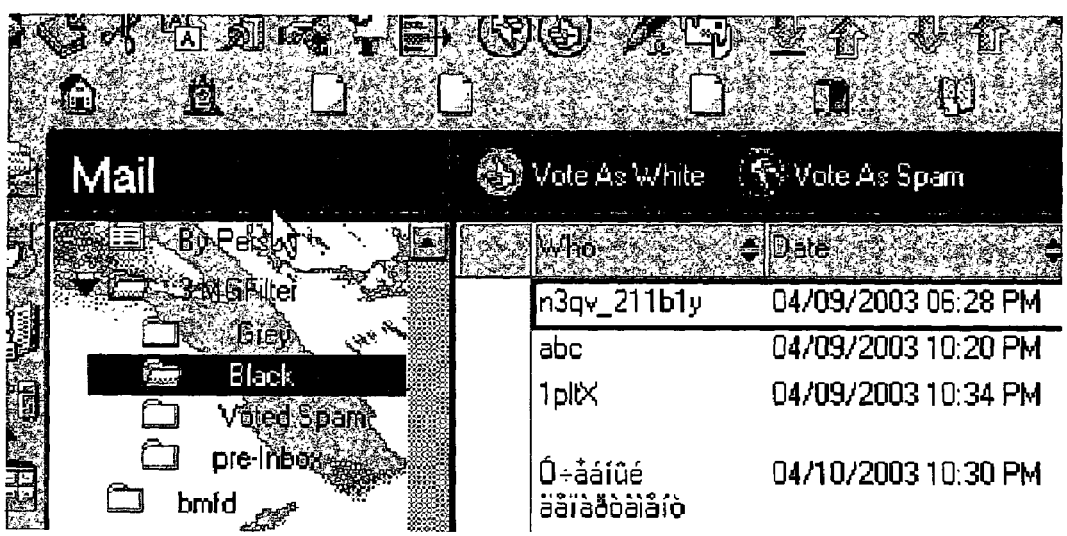
FIG. 3 is a screen shot showing a plurality of email folders according to an embodiment of the invention.

FIG. 3, shows a screen shot showing a plurality of email directories (or folder) according to an embodiment of the invention. Under the 3MGFilter directory are found the grey, black, voted spam, and pre-inbox folders. According to the embodiment illustrated in FIG. 3, email whose spaminess (content of spam-like characteristics) has been determined by the mail server to be so high that the probability of it being non-spam (white mail) is almost zero is placed in the black folder. The directory labeled gray contains email that is strongly suspected of being spam but there is a definite chance that it is not spam. The user may choose to delete spam in the black directory with little or no inspection. However, it is preferred that the user inspect the email in the gray folder before deleting any of the mail therein. Moreover some email may be placed in more than one directory such as the inbox (white) directory and the gray directory. The email placed in more than one directory is that which contain characteristics that place it in two categories or in an overlapping range. Preferably, the email place in more than one directory would include a visual indication to the user that the email is contained in more than one directory and possibly prompting the user to take some action such as voting on its spaminess. The system is preferably a smart system that uses the user's votes throughout the network as a factor in determining the spaminess scores of other email. Thus, the system is adaptive to new information acquired from handling email in the directories.

According to another embodiment, as the system learns more about the received email, it can move emails from one directory to another. For example, if a user votes an email as spam all email resembling the email that was the subject of the vote is moved from the gray directory to the black. Alternatively where the classification of an email is not certain in light of recent information the system could move it and other similar emails from the inbox to the gray directory.

The system can base its decision on which directory receives an email on criteria other than spaminess. For example, the system can mine a personal profile of the user to determine which is the appropriate directory for an email. Thus, all email from the user's spouse would be placed in the appropriate folder or all email relating to a pastime of the user such as tennis could be placed in a non-spam directory. Changes in the user profile would affect the decision as well. Other criteria for directory selection include the degree of offensiveness. The system can create multiple directories based on user behavior.

The decision of where to store received emails is not just made when the emails are received. As the system modifies its criteria based on new information observed from the user's behavior or other data it can re-classify email already received and possibly relocate the emails to the newly-appropriate directory or otherwise prompt the user to reconsider items of received email. Hence, new variables can be introduced to the classification algorithm as new considerations as determined to be relevant. Additional classification criteria may be obtained by allowing the user to adjust the level of spaminess that is required for placement of emails in say the gray or black folders. That allows for more detailed control for a user who wants to have a say in the risk involved in deleting spammy emails without looking.

The present disclosure includes that contained in the appended claims, as well as that of the foregoing description.

Although this invention has been described in its preferred form with a certain degree of particularity, it is understood that the present disclosure of the preferred form has been made only by way of example and that numerous changes in the details of construction and steps and the combination and arrangement of parts and steps may be resorted to without departing from the spirit and scope of the invention.

Now that the invention has been described, we claim:

1. A method of classifying electronic mail based upon likelihood of spam content of said electronic mail, the method comprising the steps of:
storing in a memory at least three electronic mail directories,
assigning to each electronic mail directory a range of likelihood of spam content of the electronic mail, said range being between no-likelihood-of-spam-content to very-high-likelihood-of-spam-content, wherein the likelihood of spam content ranges assigned to at least two of the electronic mail directories overlap;
using a processor for grading incoming electronic mail for likelihood of spam content, the grading based on user pre-defined criteria provided by a user;
storing in a memory each of the incoming electronic mail into one of the at least three electronic mail directories whose assigned ranges of likelihood of spam content encompass the likelihood of spam content grade of the incoming electronic mail;
storing the electronic mail whose spam content grade is encompassed within the overlap range into both of the directories whose spam content ranges overlap; and
receiving from the user at a user interface a command to adjust the level of likelihood of spam content that is required for placement of emails in the electronic mail directories.

2. The method as set forth in claim 1, further comprising presenting the user with an indication that the incoming electronic mail has been placed in more than one directory.

3. The method as set forth in claim 1, further comprising prompting the user to take an action on the incoming electronic mail that has been placed in more than one directory.

4. The method as set forth in claim 1 wherein the action comprises voting on the likelihood of spam content of the incoming electronic mail.

5. The method as set forth in claim 1 further comprising receiving new information on user behavior and re-grading the electronic mail based on the new information.

6. The method as set forth in claim 5 further comprising relocating electronic mail from one directory to another based on the re-grading.

7. The method as set forth in claim 1 further comprising:
retrieving stored electronic mail messages;
reclassifying the stored electronic mail messages according to the grading of the incoming electronic mail messages, wherein said stored electronic mail messages and the incoming electronic mail messages contain a common criterion used in the grading; and
reassigning the stored electronic mail messages to another electronic mail directory based upon the reclassification.

8. The method as set forth in claim 7 further comprising prompting the user before the stored electronic mail messages are reassigned.

9. The method as set forth in claim 1 wherein the number of directories is specified by the user.

10. The method as set forth in claim 1 further comprising assigning a label to each directory, said label comprising a user-friendly identifier.

11. The method as set forth in claim 10 wherein the user-friendly identifier is selected from a group consisting of: colors, names, tasks, content, and spam levels.

12. The method as set forth in claim 1 wherein the ranges are assigned by the user.

13. An e-mail system comprising:
a processor configured to:
analyze an incoming e-mail; and
assign a grade to the incoming e-mail, wherein said grade indicates a likelihood of spam content; and
a memory for storing:
a mailbox comprising an inbox into which is delivered e-mail which is addressed to an owner of the inbox; and
at least three e-mail directories, each assigned a user set range of likelihood of spam content of the electronic mail to be stored in each directory, said range being between no-likelihood-of-spam-content to very-high-likelihood-of-spam-content, wherein the likelihood of spam content ranges assigned to at least two of the electronic mail directories overlap such that an incoming e-mail whose grade is encompassed within the overlap is contained in both the overlap directories;
wherein the e-mail directories respectively comprise the incoming e-mail whose likelihood of spam content grade is encompassed within the likelihood of spam content range assigned to each of the directories.

14. A computer system comprising a processor for processing incoming mail, the system comprising:
the processor configured to:
analyze the incoming mail; and
assign a grade to the incoming mail, wherein said grade indicates a likelihood of spam content; and
at least three incoming mail directories into which said incoming mail is assigned, each said incoming mail directory being assigned a range of likelihood of spam content of the incoming mail, into which the incoming mail is delivered according to the respective assigned ranges of likelihood of spam content, wherein the likelihood of spam content ranges assigned to at least two of the incoming mail directories overlap such that an incoming mail message whose assigned spam grade is encompassed within the overlap is contained in both the overlap directories.

15. A non-transitory computer-readable medium comprising program instructions for:
providing at least three electronic mail directories, each assigned a range of likelihood of spam content corresponding to incoming e-mail, wherein the likelihood of spam content ranges assigned to at least two of the electronic mail directories overlap;
grading the incoming e-mail for likelihood of spam content; and
delivering the incoming e-mail into one or more of the directories whose user-set ranges of likelihood of spam content encompasses the likelihood of spam content grade of the incoming e-mail, comprising storing the incoming e-mail whose spam content grade is encompassed within the overlap range into both of the directories whose spam content ranges overlap.

* * * * *